United States Patent
Valiulla

(10) Patent No.: US 11,055,518 B2
(45) Date of Patent: Jul. 6, 2021

(54) METHODS AND SYSTEMS FOR MONITORING POTENTIAL LOSSES IN A RETAIL ENVIRONMENT

(71) Applicant: ShopperTrak RCT Corporation, Chicago, IL (US)

(72) Inventor: Adeeb N. Valiulla, Chicago, IL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/531,693

(22) Filed: Aug. 5, 2019

(65) Prior Publication Data
US 2021/0042509 A1    Feb. 11, 2021

(51) Int. Cl.
  *G06K 9/00* (2006.01)
  *G08B 13/196* (2006.01)
  *G06N 20/00* (2019.01)

(52) U.S. Cl.
  CPC ..... *G06K 9/00335* (2013.01); *G06K 9/00718* (2013.01); *G06K 9/00778* (2013.01); *G06K 9/00879* (2013.01); *G06N 20/00* (2019.01); *G08B 13/19606* (2013.01); *G08B 13/19613* (2013.01); *G06K 2009/00738* (2013.01)

(58) Field of Classification Search
  CPC .............. G08B 13/194–19697; G06K 9/00335
  See application file for complete search history.

(56) References Cited

U.S. PATENT DOCUMENTS

| | | | |
|---|---|---|---|
| 6,989,745 B1 * | 1/2006 | Milinusic | G08B 13/19604 340/501 |
| 7,200,266 B2 * | 4/2007 | Ozer | G06K 9/00335 382/100 |

(Continued)

FOREIGN PATENT DOCUMENTS

| | | | |
|---|---|---|---|
| CN | 102663452 B | * | 11/2013 |
| CN | 106570996 A | * | 4/2017 |

(Continued)

OTHER PUBLICATIONS

International Search Report issued in corresponding International Application No. PCT/US2020/044310 dated Nov. 19, 2020.

*Primary Examiner* — Robert J Hance
(74) *Attorney, Agent, or Firm* — Arent Fox, LLP

(57) ABSTRACT

Examples described herein generally relate to a system for monitoring customers in a retail environment. The system includes a plurality of cameras located in different regions of the retail environment, each camera configured to capture a video feed of a respective region. The system includes a computer system comprising a memory and a processor. The system provides the video feed of at least one region of the retail environment to a plurality of machine learning classifiers, each machine learning classifier trained on labeled videos to classify a sequence of images of a customer into a probability certainty of a respective activity being performed by the customer. The system applies the probability certainties of the respective activities of a customer to a set of business rules to determine whether customer activities identified by the probability certainties indicate suspicious behavior. The system provides a notification of the suspicious behavior to a worker.

18 Claims, 4 Drawing Sheets

(56) References Cited

U.S. PATENT DOCUMENTS

| | | | |
|---|---|---|---|
| 2009/0089107 A1* | 4/2009 | Angell | G06Q 10/00 705/7.28 |
| 2009/0276705 A1* | 11/2009 | Ozdemir | G06K 9/00771 715/708 |
| 2014/0333775 A1* | 11/2014 | Naikal | G06K 9/00711 348/159 |
| 2018/0350218 A1* | 12/2018 | Jeon | G08B 13/19645 |
| 2018/0357247 A1* | 12/2018 | Siminoff | G08B 13/19671 |
| 2019/0197369 A1* | 6/2019 | Law | G06K 9/00771 |
| 2019/0205643 A1 | 7/2019 | Liu et al. | |
| 2019/0311346 A1* | 10/2019 | Costello | G06Q 20/18 |
| 2020/0349820 A1* | 11/2020 | Speagle | G06K 9/00711 |

FOREIGN PATENT DOCUMENTS

| | | | | |
|---|---|---|---|---|
| CN | 109544837 A | * | 3/2019 | |
| CN | 109685039 A | * | 4/2019 | |
| CN | 109697815 A | * | 4/2019 | |
| CN | 110060441 A | * | 7/2019 | |
| WO | WO-2010011277 A1 | * | 1/2010 | G06Q 10/08 |

\* cited by examiner

METHODS AND SYSTEMS FOR MONITORING POTENTIAL LOSSES IN A RETAIL ENVIRONMENT

BACKGROUND

The present disclosure relates to monitoring retail locations, and more particularly to loss prevention systems within the monitored retail locations.

Retail locations may be equipped with a variety of system to mitigate losses due to theft and damage. For example, retail locations may use camera systems to record events within the retail location. The video feeds from such camera systems may be monitored by security personnel and may be recorded for use as evidence. Retail locations may also use tags to track specific items and detect when tagged items are removed from the retail location. Such conventional systems, however, may only detect a loss event when the loss has actually occurred. In some cases, a loss may be recovered, but in other cases, goods may be damaged or other expenses may be incurred in handling the loss event. Therefore, other than a general deterrent effect, such conventional systems may not be able to prevent losses.

Thus, there is a need in the art for improvements in loss prevention systems. In particular, there is a need for systems and methods for predicting loss events in time to stop the loss events.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a system for monitoring customers in a retail environment for potential losses. The system may include a plurality of cameras located in different regions of the retail environment, each camera configured to capture a video feed of a respective region. The system may include a computer system comprising a memory storing computer executable instructions and a processor configured to execute the instructions. The processor may provide the video feed of at least one region of the retail environment to a plurality of machine learning classifiers, each machine learning classifier trained on labeled videos to classify a sequence of images of a customer into a probability certainty of a respective activity being performed by the customer. The processor may apply the probability certainties of the respective activities of a customer to a set of business rules to determine whether customer activities identified by the probability certainties indicate suspicious behavior. The processor may provide a notification of the suspicious behavior to a worker at the retail environment.

In an aspect, the processor is configured to execute the instructions to apply the probability certainty to the business rules to: determine a weight for each respective activity; determine an activity score for each activity based on the probability certainty for the activity and the weight for each respective activity; and determine that the customer activities indicate suspicious behavior in response to a total score satisfying a threshold. The business rules may define a customizable priority of the customer activities, wherein the weight is based on the priority.

In an aspect, the processor is configured to execute the instructions to receive a selection, from an operator, of at least one of the plurality of machine learning classifiers from a set of machine learning classifiers for abnormal activities for the retail environment. Each abnormal activity may correspond to one of the labels of the labeled videos for one of the machine learning classifiers.

In an aspect, the processor is configured to execute the instructions to receive a selection, from an operator, of at least one of the plurality of machine learning classifiers from a set of machine learning classifiers for normal activities for the retail environment. Each normal activity may correspond to one of the labels of the labeled videos for one of the machine learning classifiers.

In an aspect, the processor is configured to execute the instructions to: determine a location of the customer in the video feed; determine a set of activities for the location; and adjust the probability certainty of the activity based on whether the activity is in the set of activities for the location.

In an aspect, the processor is configured to execute the instructions to: identify the customer; and associate the customer with stored probability certainties of previous activities of the customer, wherein the business rules apply a weight to the stored probability certainties of previous activities.

In an aspect, the plurality of machine learning classifiers includes classifiers trained using unsupervised learning on training videos of events occurring prior to loss events to identify a correlation between the training videos and the video feed.

In an aspect, the notification includes an identification of one or more of the activities being performed by the customer.

As another example, the disclosure provides a method of monitoring customers in a retail environment. The method may include capturing a video feed of a plurality of regions of the retail environment via a plurality of cameras. The method may include providing a video feed of at least one region of the retail environment to a plurality of machine learning classifiers, each machine learning classifier trained on labeled videos to classify a sequence of images of a customer into a probability certainty of a respective activity being performed by the customer. The method may include applying the probability certainties of the respective activities of a customer to a set of business rules to determine whether the customer activities indicate suspicious behavior. The method may include providing a notification of the suspicious behavior to a worker.

In another example, the disclosure provides a non-transitory computer readable medium storing computer executable instructions. The instructions, when executed by a processor, cause the processor to monitor customers in a retail environment. The non-transitory computer readable medium may include instructions to capture a video feed of a plurality of regions of a retail environment via a plurality of cameras. The non-transitory computer readable medium may include instructions to provide the video feed of at least one region of the retail environment to a plurality of machine learning classifiers, each machine learning classifier trained on labeled videos, to classify a sequence of images of a customer into a probability certainty of a respective activity being performed by the customer. The non-transitory computer readable medium may include instructions to apply the probability certainties of the respective activities of a customer to a set of business rules to determine whether the customer activities indicate suspicious behavior. The non-transitory computer readable medium may include instructions to provide a notification of the suspicious behavior to a worker.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for of predicting a loss event in a retail location based on suspicious behavior. The disclosure provides a system including a plurality of machine learning classifiers that determine probabilities of customers in the retail location performing various activities based on videos of the customers. The system may operate in real-time or near real time to classify the activities of the customers. The system may include configurable business rules for determining whether the activities of a customer indicate suspicious behavior that should be investigated. The system may provide a notification to a worker at the retail location when suspicious activity is detected.

Current techniques for handling loss events in retail locations are typically limited to reactive actions after a loss has occurred. Additionally, current techniques are often subjective, relying on the experience and expertise of loss prevention workers (e.g., security personnel). Any human evaluation of behavior may be subject to explicit and implicit biases of the workers. Accordingly, there is a need for a loss prevention system that objectively identifies suspicious behavior prior to a loss event occurring such that actions may be taken to prevent or mitigate the loss.

In an example, the present disclosure provides a loss prevention system and methods for evaluating customer activity based on recorded video of customers within the retail location using machine-learning. The loss prevention system provides a video feed of a customer to a plurality of activity models. Each activity model is a machine-learning model that has been trained on labeled videos of customers performing various activities. Each of the activity models determines a probability certainty that the activity of the customer corresponds to the respective activity on which the activity model was trained. The loss prevention system may then apply customizable rules to determine whether the various activities of the customer are indicative of suspicious behavior for the retail location. The loss prevention system may provide a notification to a worker at the retail location such that the worker may appropriately respond to the suspicious behavior.

Figure 1:
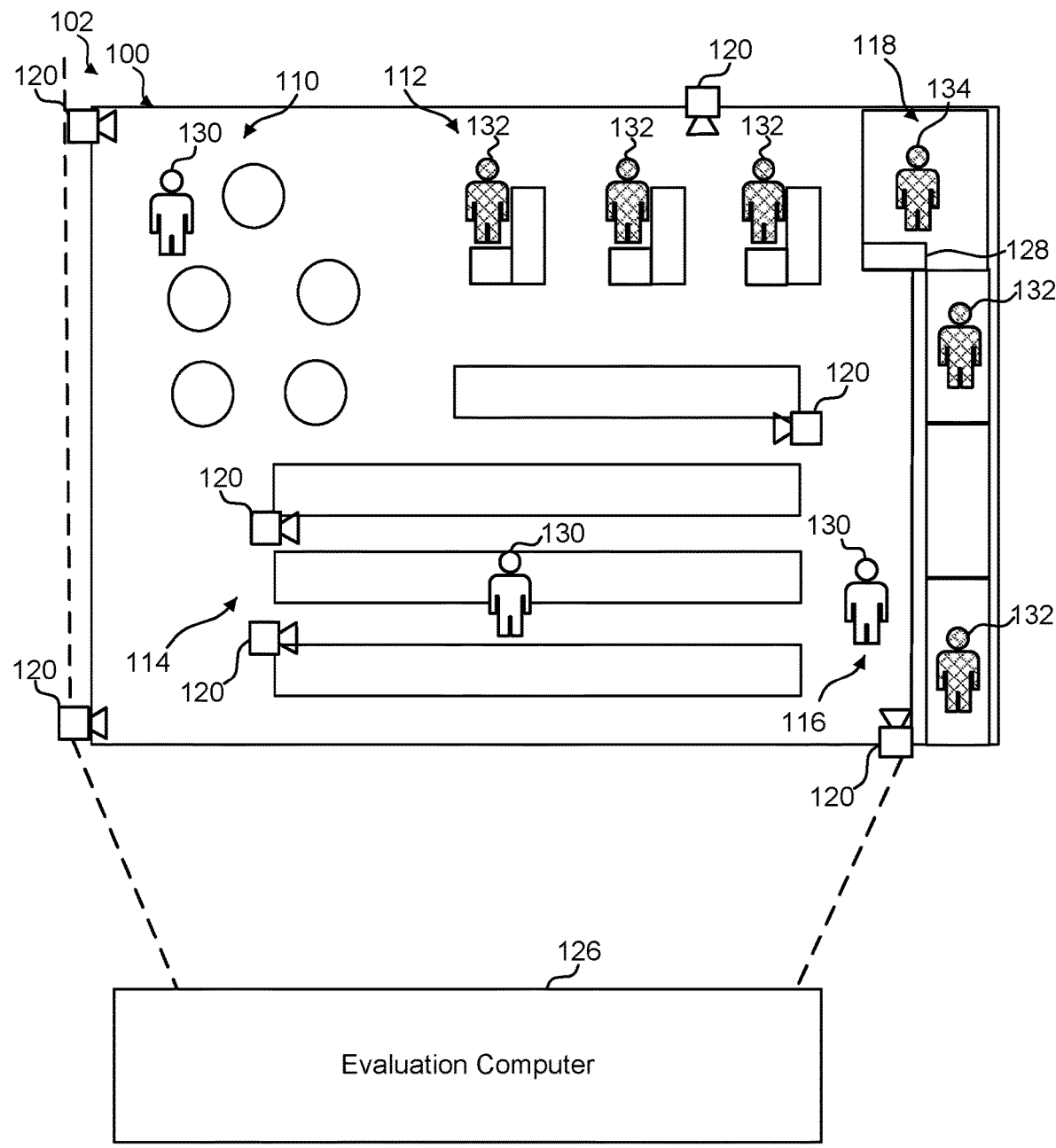
FIG. 1 is a schematic diagram of an example retail location including a loss prevention system.

Referring now to FIG. 1, an example retail location 100 includes multiple regions where customers 130 may be present and perform various activities that are evaluated by a loss prevention system 102. For example, the retail location 100 may include an open display area 110, a front end 112, aisles 114, service counters 116, and a security office 118. Workers 132 may be located throughout the retail location 100 and may perform a security role in addition to other tasks. One or more security personnel 134 may also be located within the retail location 100, for example, in the security office 118. A person of skill in the art would understand that the disclosed systems and methods are applicable to a variety of retail locations and the present disclosure is not limited to the example retail location or areas and associated activities thereof.

The loss prevention system 102 may include multiple cameras 120 and an evaluation computer 126. Each camera 120 may be a digital video camera such as a security camera. The multiple cameras 120 may be located throughout the retail location 100. Each of the cameras 120 may provide a constant video feed of one or more of the areas of the retail location 100. The cameras 120 may generally be oriented in a default direction to capture a particular view of the retail location 100 where activity is expected, but one or more of the cameras 120 may be mounted on a gimbal that allows rotation and panning of the respective camera 120. For example, the labor evaluation system 102 may move a camera 120 to maintain the field of view of the camera 120 on a customer 130. In another aspect, the labor evaluation system 102 may allow manual control over one or more cameras 120, for example, by security personnel 134. In an aspect, the loss prevention system 102 may be integrated with other retail systems (e.g., traffic estimation), and the video feed of the cameras 120 may be used for multiple purposes.

The evaluation computer 126 may be any computer device programmed to evaluate at least a video feed from one or more of cameras 120 to identify customer activities and evaluate rules to determine whether the customer activities indicate suspicious behavior. The evaluation computer 126 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing video data. In an aspect, the evaluation computer 126 may include a display 128 located in the security office 118. The display 128 may provide notifications generated by the evaluation computer 126. The display 128 may also provide real-time analysis by presenting information overlaid on one or more video feeds. For example, the display 128 may display a video feed including a customer 130 that is being evaluated. The video feed may be supplemented with information such as probability certainties for one or more activities.

Figure 2:
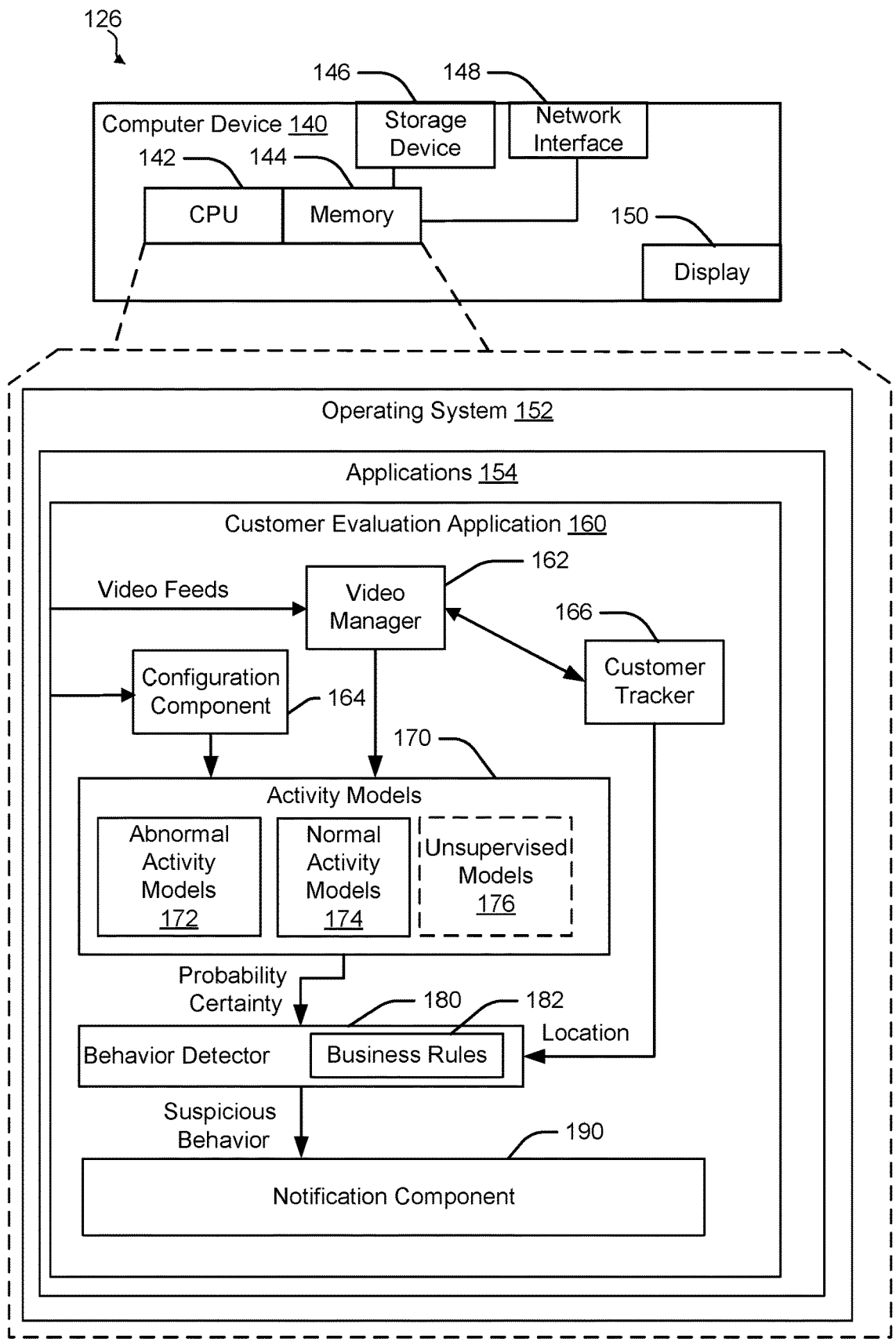
FIG. 2 is a diagram of an example computer system implementing a loss prevention system.

Turning to FIG. 2, an example computer device 140 may be used to implement the evaluation computer 126. The computer device 140 may include a central processing unit (CPU) 142 that executes instructions stored in memory 144. For example, the CPU 142 may execute an operating system 152 and one or more applications 154, which may include a customer evaluation application 160. The computer device 140 may include a storage device 146 for storing data (e.g., video data streams). The computer device 140 may also include a network interface 148 for communication with external devices via a network. For example, the computer device 140 may communicate with the cameras 120. In an aspect, the computer device 140 may communicate with a server via a network to receive activity models 170. The activity models 170 may be installed in a local version of the customer evaluation application. In an aspect, the customer evaluation application may operate locally for minimum latency, however, various functions performed by the customer evaluation application 160 may be performed by a server via the network.

The computer device 140 may include a display 150, which may correspond to the display 128 and/or include an additional display for configuration. The display 150 may be, for example, a computer monitor and/or a touch-screen. The display 150 may provide information to an operator (e.g., the security personnel 134) and allow the operator to configure the computer device 140.

Memory 144 may be configured for storing data and/or computer-executable instructions defining and/or associated with an operating system 152 and/or application 154, and CPU 142 may execute operating system 152 and/or applications 154. Memory 144 may represent one or more hardware memory devices accessible to computer device 140. An example of memory 144 can include, but is not limited to, a type of memory usable by a computer, such as random access memory (RAM), read only memory (ROM), tapes, magnetic discs, optical discs, volatile memory, non-volatile memory, and any combination thereof. Memory 144 may store local versions of applications being executed by CPU 142. In an implementation, the memory 144 may include a storage device, which may be a non-volatile memory.

The CPU 142 may include one or more processors for executing instructions. An example of CPU 142 can include, but is not limited to, any processor specially programmed as described herein, including a controller, microcontroller, application specific integrated circuit (ASIC), field programmable gate array (FPGA), system on chip (SoC), or other programmable logic or state machine. The CPU 142 may include other processing components such as an arithmetic logic unit (ALU), registers, and a control unit. The CPU 142 may include multiple cores and may be able to process different sets of instructions and/or data concurrently using the multiple cores to execute multiple threads.

The operating system 152 may include instructions (such as applications 154) stored in memory 144 and executable by the CPU 142. The applications 154 may include a customer evaluation application 160 configured to analyze one or more video feeds from the cameras 120 to determine activities performed by a customer 130. In an aspect, the customer evaluation application 160 may track a customer 130 in multiple video feeds to determine a location of the customer 130 and/or assist with the analysis of the video stream. Additionally, the customer evaluation application 160 may determine whether the activities indicate suspicious behavior. The customer evaluation application 160 may notify a worker at the retail location if suspicious behavior is detected.

The customer evaluation application 160 may include a video manager component 162. The video manager component 162 may receive a plurality of video feeds from the cameras 120. The video manager component 162 may store the video feeds and metadata identifying each video feed (e.g., area of store). The video manager component 162 may provide video feeds that meet specified criteria to other components as discussed in detail below.

The customer evaluation application 160 may include a configuration component 164 that receives a configuration from an operator, who may be the security personnel 134 (e.g., a loss prevention manager). For example, the configuration component 164 may provide a user interface that allows the operator to select from various models, rules, and other parameters to generate a configuration. The configuration may specify activity models 170 to evaluate a video feed. For example, the configuration may include a selection from abnormal activity models 172, normal activity models 174, and/or unsupervised models 176 as discussed in further detail below. The configuration may include business rules 182 or properties thereof. For example, the operator may configure the business rules 182 based on preferences for the retail location 100.

The customer evaluation application 160 may include a customer tracker 166. The customer tracker 166 may be configured to determine a location of a customer 130 at a particular time. In an aspect, for example, the customer tracker 166 may track customer 130 starting from a known location (e.g., an entrance). The customer tracker 166 may use motion data and/or the video data to determine where the customer 130 is at any time. For example, the customer tracker 166 may use a location provided in the motion data and/or facial recognition of a customer 130 in a particular video to determine the location of the customer 130. The customer tracker 166 may analyze height, gender, age, gait, or clothing of a customer 130 to tag or label a specific customer and/or to distinguish customers 130 from workers 132. The location of customers 130 may be used to determine the customer 130 in a video when determining an activity being performed. In an aspect, the customer tracker 166 may label, tag, or otherwise associate video segments with identifiers of customers 130. The identifier of the customer may be a randomly generated number that is not necessarily linked to any personally identifiable information of the customer 130. The tracked identity and/or location of the customer may also be used to aggregate information regarding different activities performed by the same customer 130 within different regions of the retail location 100. For example, the customer evaluation application 160 may build a profile associated with the identifier for a customer 130. The profile may include, for example, activities of the customer 130, a time of the activity, and a location of the activity.

The customer evaluation application 160 may include a plurality of activity models 170. The activity models 170 may include machine learning classifiers trained on labeled videos, to classify a sequence of images of a customer 130 into a probability certainty of an activity being performed by the customer 130. That is, the labeled videos may be manually labeled by a human (e.g., a security expert) with an identity of the activity being performed in the video. Each activity model 170 may utilize supervised learning to learn to classify an input video (e.g., a sequence of images) and determine a probability certainty that the labeled activity is being performed. In an aspect, for example, each activity model 170 may be trained using reinforcement learning with a goal to correctly identify an activity being performed in a video segment. The activity model 170 may determine a probability certainty for each activity. The probability certainty may indicate a confidence level of the activity model 170. For example, when the input video stream closely matches the labeled training videos for one activity, the respective activity model 170 may determine a high probability certainty for that activity. In contrast, when the input video stream is similar to the activity in training videos for different activities, the activity models 170 may determine two or more probability certainties for those activities, each of which may be lower than the high probability certainty when there is a single matching activity.

In an aspect, the activity models 170 may include a set of abnormal activity models 172 that are trained on a set of training videos for abnormal activities. The abnormal activities may be activities that customers 130 are not expected to perform in the retail location 100 or activities that are known to be associated with loss events. Example abnormal activities used to train the abnormal activity models 172 may include: watching employees such as a cashier or salesperson, wearing clothing inconsistent with the weather, looking in a direction away from the hands of the customer, repeated visits to the retail location without making a purchase, and standing closer to the merchandise than normal. As discussed above, the loss prevention system 102 may be applied to various retail locations. In an aspect, the abnormal activity models 172 may be customized for a particular retail location. For example, an operator may select a subset of abnormal activity models 172 for inclusion within the activity models 170. Accordingly, an activity such as touching merchandise, which may be considered abnormal in one retail location, but may not be considered abnormal in another retail location due to different types of retail location, type of merchandise, or different local practices, may be included only when considered abnormal.

In an aspect, the activity models 170 may include a set of normal activity models 174 in combination with the set of abnormal activity models 172. The set of normal activity models 174 may include activities that are typical of customers at the retail location 100. For example, the set of normal activity models 174 may include models trained on videos of customers placing merchandise in a shopping cart, shopping basket, or shopping bag, customers interacting with mobile phone or shopping list, or customers 130 talking with workers 132 or other customers 130. Similar to the abnormal activity models 172, the normal activity models 174 may be selected by an operator for a particular retail location. In an aspect, the normal activity models 174 may be used to distinguish normal activities from suspicious behavior. For example, an activity such as removing a product from a shelf and placing the product in a shopping cart may at least partially match an abnormal activity model 172 (e.g., touching merchandise) and match a normal activity model 174 (e.g., placing merchandise in the shopping cart). If only the abnormal activity models 172 were considered, the activity may indicate suspicious activity, but by matching the same activity to the normal activity model 174 (with a higher probability certainty) the customer evaluation application 160 may have a more accurate view of the activity. Accordingly, the activity models 170 may distinguish between abnormal activities and normal activities.

In another aspect, the activity models 170 may optionally include unsupervised models 176 that are not associated with a label for a particular activity. Instead, unsupervised activity models 176 may be trained based on videos of customers prior to loss events associated with the customer. For example, the training data for the unsupervised activity models 176 may include videos of shoplifters for a time frame prior to known shoplifting events. Unsupervised learning techniques may be used to discover correlations between the training data that may not be recognized as abnormal activities. The unsupervised learning techniques may be applied to training sets for particular retail locations or particular merchandise. For example, if one or more retail locations detect a high level of theft associated with a particular product, a first training set of videos of customers who interact with the particular product may be compared with purchases of the product to determine a first set of legitimate purchasers. The unsupervised learning techniques may be applied to a first training set of legitimate purchasers to identify correlations among the activity of the legitimate purchasers (e.g., time spent selecting the product, how the product is placed into a cart.) Similarly, if thefts are detected after the fact, videos of the identified thieves may form a second training set, and the unsupervised learning techniques may be applied to determine correlations among the identified thieves. An unsupervised model 176 may then be generated to determine whether a video feed corresponds to the first training set or the second training set.

The customer evaluation application 160 may include a behavior detector 180. The behavior detector 180 may determine, based on the probability certainties generated by the activity models 170, whether the customer activities indicate suspicious behavior. In an aspect, the behavior detector 180 may apply business rules 182 to the probability certainties to determine whether the activities of the customer 130 indicate suspicious activity. The business rules 182 may be configurable logical rules for evaluating probability certainties individually and/or in combination. For example, in an aspect, the business rules 182 may define a weight for each activity identified by the activity models 170. The weight may be based on a customizable priority of the customer activities defined by the business rules 182. For instance, the weight may be positive if the activity is an abnormal activity that is a high priority for the retail location 100 and the weight may be negative if the activity is a normal activity for the retail location 100. An operator may assign the weights based on the specific retail location 100. The behavior detector 180 may execute the business rules 182 to determine a total weight of the activities. For example, the behavior detector 180 may multiply the weight by the probability certainty to determine an activity score for each activity, and determine a sum of the activity scores. The behavior detector 180 may determine that the activities of the customer indicate suspicious behavior if the total score satisfies a threshold.

In an aspect, the behavior detector 180 may adjust the probability certainties for one or more activities based on information on which the activity model 170 is not trained. For example, because the layout of a retail location 100 may be unique, the activity model 170 may not be trained based on areas or regions within the retail location 100. The area or region, however, may be useful for identifying an activity being performed. For example, one or more activities may be associated with each of the regions of the retail location 100. For example, the open display area 110 may be associated with handling merchandise (e.g., comparing clothes or selecting produce. Accordingly, the behavior detector 180 may adjust (e.g., increase) the probability certainty for a handling merchandise activity detected in the open display area 110.

The customer evaluation application 160 may include a notification component 190. The notification component 190 may providing a notification to a worker 132 of the suspicious behavior. For example, the notification component 190 may display the notification on the display 128, and/or may send the notification to a portable device associated with the worker 132. The notification may include an identification of one or more of the activities being performed by the customer. In an aspect, the notification may instruct to worker 132 to engage the customer 130. For example, the worker 132 may ask the customer 130 if the customer needs assistance. In general, because the loss prevention system 102 identifies abnormal behavior and predicts a loss event, the notification may not trigger a public alarm or otherwise accuse the customer 130 of a loss event that has not yet occurred.

Figure 3:
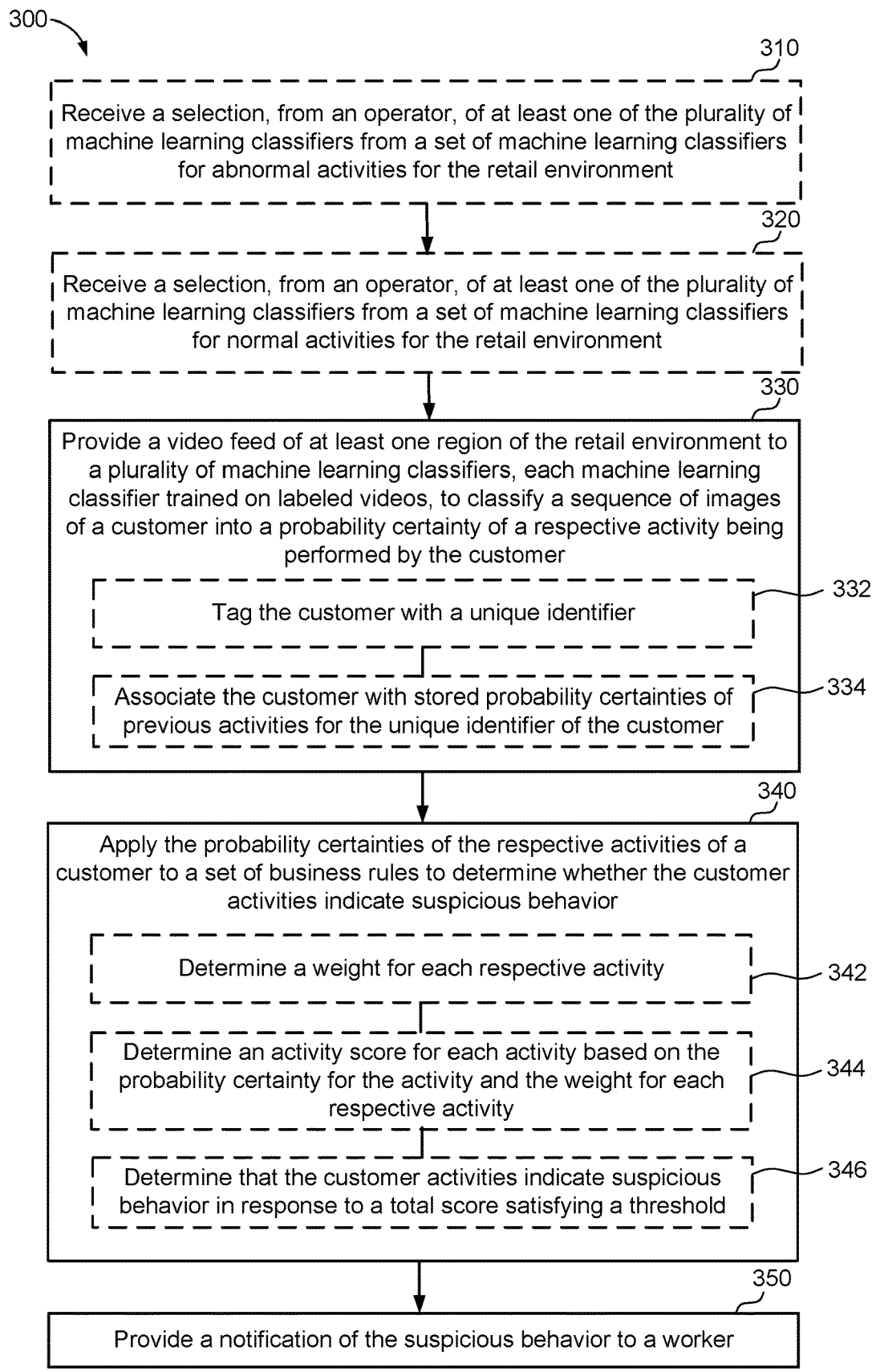
FIG. 3 is a flowchart of an example method of predicting a loss event based on suspicious behavior, in accordance with an implementation of the present disclosure.

Turning to FIG. 3, an example method 300 detects suspicious behavior based on customer activities for a retail location 100. For example, method 300 may be performed by the user customer evaluation application 160 on the computer device 140. Optional blocks are shown with dashed lines.

At block 310, the method 300 may optionally include receiving a selection, from an operator, of at least one of the plurality of machine learning classifiers from a set of machine learning classifiers for abnormal activities for the retail environment. The abnormal activities may correspond to the labels of the labeled videos used to train the machine learning classifiers. In an aspect, for example, the configuration component 164 may receive the selection, from an operator (e.g., a worker 132), of at least one of the plurality of machine learning classifiers from a set of machine learning classifiers for abnormal activities (e.g., abnormal activity models 172) for the retail environment (e.g., retail location 100).

At block 320, the method 300 may optionally include receiving a selection, from an operator, of at least one of the plurality of machine learning classifiers from a set of machine learning classifiers for normal activities for the retail environment. The normal activities may correspond to the labels of the labeled videos used to train the machine learning classifiers. In an aspect, for example, the configuration component 164 may receive the selection, from the operator, of at least one of the plurality of machine learning classifiers from a set of machine learning classifiers for normal activities (e.g., normal activity models 174) for the retail location 100.

At block 330, the method 300 may include providing a video feed of at least one region of the retail environment to a plurality of machine learning classifiers, each machine learning classifier trained on labeled videos, to classify a sequence of images of a customer into a probability certainty of a respective activity being performed by the customer. In an aspect, for example, the video manager component 162 may provide the video feed of at least one region of the retail location 100 to a plurality of machine learning classifiers (e.g., activity models 170), each machine learning classifier trained on labeled videos, to classify a sequence of images of a customer 130 into a probability certainty of a respective activity being performed by the customer 130. For instance, the activities being performed by the customer 130 may be selected from the activities for the abnormal activity models 172 and/or the normal activity models 174.

At sub-block 332, providing the video feed in block 330 may optionally include tagging the customer with a unique identifier. In an aspect, for example, the customer tracker 166 may tag the customer 130 with the unique identifier. For example, the customer tracker 166 may assign each customer 130 a unique identifier. The customer tracker 166 may determine whether a customer entering the store corresponds to an existing identifier, for example, using facial recognition, height, gender, age, gait, or clothing. The customer tracker 166 may associate a video feed with a customer 130 present in the video.

At sub-block 334, providing the video feed in block 330 may optionally include associating the customer with stored probability certainties of previous activities for the unique identifier of the customer. In an aspect, for example, the customer tracker 166 may associate the customer with stored probability certainties for previous activities of the customer tagged with the unique identifier. For example, the customer tracker 166 may retrieve stored probability certainties from a previous visit by the customer based on the unique identifier. Accordingly, repeated activities by the same customer 130 may be detected (e.g., multiple visits to the retail location 100 without making a purchase).

At block 340, the method 300 may include applying the probability certainties of the respective activities of a customer to a set of business rules to determine whether the customer activities indicate suspicious behavior. In an aspect, for example, the behavior detector 180 may apply the probability certainties of the respective activities of a customer to a set of business rules 182 to determine whether the customer activities indicate suspicious behavior.

For example, at sub-block 342, the block 340 may optionally include determining a weight for each respective activity. For example, the business rules 182 may indicate a weight for each respective activity or a rule for calculating a weight, for example, based on a priority of the activity.

At sub-block 344, the block 340 may optionally include determining an activity score for each activity based on the probability certainty for the activity and the weight for each respective activity. In an aspect, for example, the behavior detector 180 may determine the activity score for each activity based on the probability certainty for the activity and the weight for each respective activity. For example, the behavior detector 180 may multiply the probability certainty by the weight. In another aspect, if the probability certainty satisfies a threshold, the behavior detector 180 may multiply the weight by a constant value. Similarly, activities with probability certainties that do not satisfy the threshold may be excluded, multiplied by zero, or otherwise given a reduced weight.

At sub-block 346, the block 340 may optionally include determining that the customer activities indicate suspicious behavior in response to a total score satisfying a threshold. For example, the behavior detector 180 may determine that the customer activities indicate suspicious behavior in response to a total score satisfying a threshold.

In an aspect, applying the probability certainties to the respective activities may include adjusting the probability certainties based on a location of the customer. For example, the customer tracker 166 may determine a location of the customer in the video feed. The behavior detector 180 may determine a set of activities for the location. The behavior detector 180 may adjust the probability certainty of the activity based on whether the activity is in the set of activities for the location.

At block 350, the method 300 may include providing a notification of the suspicious behavior to a worker. In an aspect, for example, the notification component 190 may provide the notification of the suspicious behavior to a worker 132. For example, the notification component 190 may display the notification on the display 128 or send the notification to a device of the worker 132. The notification may include an identification of one or more of the activities being performed by the customer 130.

Figure 4:
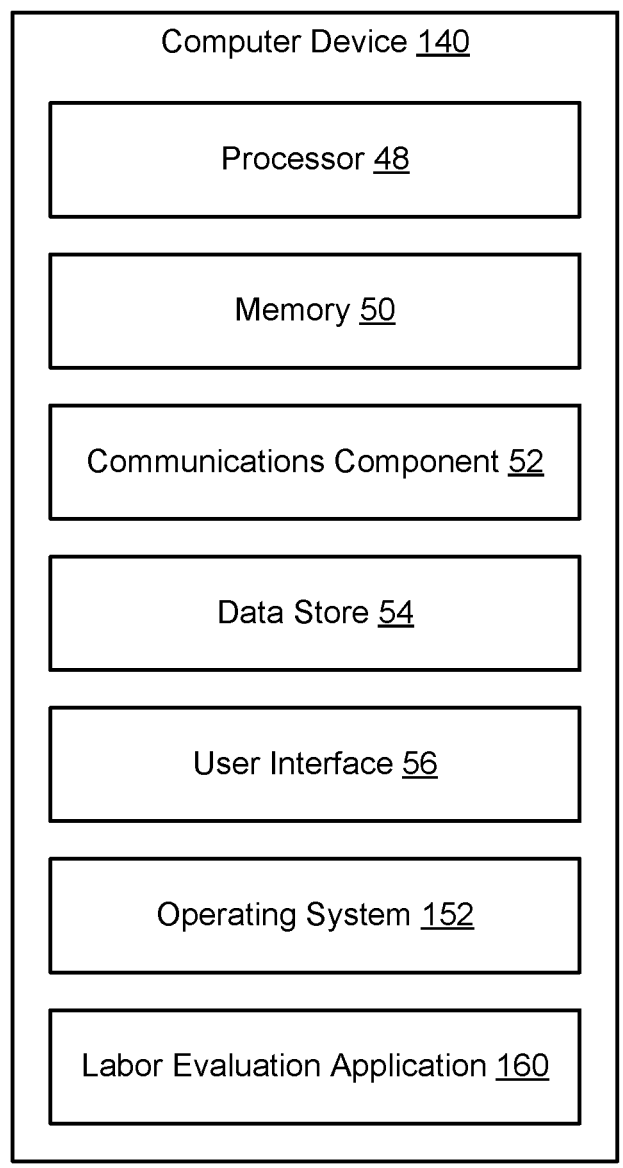
FIG. 4 is a schematic block diagram of an example computer device, in accordance with an implementation of the present disclosure.

Referring now to FIG. 4, illustrated is an example computer device 140 in accordance with an implementation, including additional component details as compared to FIG. 2. In one example, computer device 140 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 142.

In an example, computer device 140 may include memory 50 for storing instructions executable by the processor 48 for carrying out the functions described herein. In an implementation, for example, memory 50 may include memory 144. The memory 50 may include instructions for executing the customer evaluation application 160.

Further, computer device 140 may include a communications component 52 that provides for establishing and maintaining communications with one or more parties utilizing hardware, software, and services as described herein. Communications component 52 may carry communications between components on computer device 140, as well as between computer device 140 and external devices, such as devices located across a communications network and/or devices serially or locally connected to computer device 140. For example, communications component 52 may include one or more buses, and may further include transmit chain components and receive chain components associated with a transmitter and receiver, respectively, operable for interfacing with external devices.

Additionally, computer device 140 may include a data store 54, which can be any suitable combination of hardware and/or software, that provides for mass storage of information, databases, and programs employed in connection with implementations described herein. For example, data store 54 may be a data repository for operating system 152 and/or applications 154. The data store may include memory 144 and/or storage device 146.

Computer device 140 may also include a user interface component 56 operable to receive inputs from a user of computer device 140 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 152 and/or applications 154. In addition, processor 48 may execute operating system 152 and/or applications 154, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A system for monitoring customers in a retail environment for potential losses, comprising:
   a plurality of cameras located in different regions of the retail environment, each camera configured to capture a video feed of a respective region; and
   a computer system comprising a memory storing computer executable instructions and a processor configured to execute the instructions to:
      provide the video feed of at least one region of the retail environment to a plurality of machine learning classifiers, a first portion of the plurality of machine learning classifiers trained on labeled videos to classify a sequence of images of a customer into a probability certainty of a respective activity being performed by the customer to define probability certainties of the respective activities of the customer, and a second portion of the plurality of machine learning classifiers that are not associated with a label for a particular activity and are trained using unsupervised learning on training videos of events occurring prior to loss events to identify a correlation between the training videos and the video feed;
      apply the probability certainties of the respective activities of the customer and the correlation between the training videos and the video feed to a set of business rules to determine whether the respective activities of the customer identified by the probability certainties indicate suspicious behavior, wherein the processor is configured to execute the instructions to apply the probability certainties to the business rules to:
         determine a weight for each respective activity;
         determine an activity score for each respective activity based on the probability certainty for the respective activity and the weight for each respective activity; and
         determine that the respective activities of the customer indicate suspicious behavior in response to a sum of each activity score for each respective activity satisfying a threshold; and
      provide a notification of the suspicious behavior.

2. The system of claim 1, wherein the business rules define a customizable priority of the respective activities of the customer, wherein the weight is based on the priority.

3. The system of claim 1, wherein the processor is configured to execute the instructions to receive a selection, from an operator, of at least one of the plurality of machine learning classifiers from a set of machine learning classifiers for abnormal activities for the retail environment, wherein each abnormal activity corresponds to one of the labels of the labeled videos for one of the machine learning classifiers.

4. The system of claim 1, wherein the processor is configured to execute the instructions to receive a selection, from an operator, of at least one of the plurality of machine learning classifiers from a set of machine learning classifiers for normal activities for the retail environment, wherein each normal activity corresponds to one of the labels of the labeled videos for one of the machine learning classifiers.

5. The system of claim 1, wherein the processor is configured to execute the instructions to:
   determine a location of the customer in the video feed;
   determine a set of activities for the location; and
   adjust the probability certainty of the respective activity based on whether the respective activity is in the set of activities for the location.

6. The system of claim 1, wherein the processor is configured to execute the instructions to:
   identify the customer; and
   associate the customer with stored probability certainties of previous activities of the customer, wherein the business rules apply a weight to the stored probability certainties of previous activities.

7. The system of claim 1, wherein the second portion of the plurality of machine learning classifiers trained using unsupervised learning are trained on a set of videos of shoplifters for a time frame prior to known shoplifting events.

8. The system of claim 1, wherein the notification includes an identification of one or more of the respective activities being performed by the customer.

9. A method of monitoring customers in a retail environment, comprising:
   capturing a video feed of a plurality of regions of the retail environment via a plurality of cameras;
   providing the video feed of at least one region of the retail environment to a plurality of machine learning classifiers, a first portion of the plurality of machine learning classifiers trained on labeled videos to classify a sequence of images of a customer into a probability certainty of a respective activity being performed by the customer to define probability certainties of the respective activities of the customer, and a second portion of the plurality of machine learning classifiers that are not associated with a label for a particular activity and are trained using unsupervised learning on training videos of events occurring prior to loss events to identify a correlation between the training videos and the video feed;

applying the probability certainties of the respective activities of the customer and the correlation between the training videos and the video feed to a set of business rules to determine whether the respective activities of the customer identified by the probability certainties indicate suspicious behavior, wherein applying the probability certainties to the business rules comprises:

determining a weight for each respective activity;

determining an activity score for each respective activity based on the probability certainty for the respective activity and the weight for each respective activity; and determining that the respective activities of the customer indicate suspicious behavior in response to a sum of each activity score for each respective activity satisfying a threshold; and providing a notification of the suspicious behavior.

10. The method of claim 9, wherein the business rules define a customizable priority of the respective activities of the customer, wherein the weight is based on the priority.

11. The method of claim 9, further comprising receiving a selection, from an operator, of at least one of the plurality of machine learning classifiers from a set of machine learning classifiers for abnormal activities for the retail environment, wherein the abnormal activities correspond to the labels of the labeled videos.

12. The method of claim 9, further comprising receiving a selection, from an operator, of at least one of the plurality of machine learning classifiers from a set of machine learning classifiers for normal activities for the retail environment, wherein the normal activities correspond to the labels of the labeled videos.

13. The method of claim 9, further comprising:

determining a location of the customer in the video feed;

determining a set of activities for the location; and adjusting the probability certainty of the respective activity based on whether the respective activity is in the set of activities for the location.

14. The method of claim 9, wherein providing the video feed comprises:

identifying the customer; and associating the customer with stored probability certainties of previous activities of the customer, wherein the business rules apply a weight to the stored probability certainties of the previous activities.

15. The method of claim 9, wherein the second portion of the plurality of machine learning classifiers trained using unsupervised learning are trained on a set of videos of shoplifters for a time frame prior to known shoplifting events.

16. The method of claim 9, wherein the notification includes an identification of one or more of the respective activities being performed by the customer.

17. A non-transitory computer readable medium storing computer executable instructions that when executed by a processor cause the processor to:

capture a video feed of a plurality of regions of a retail environment via a plurality of cameras;

provide the video feed of at least one region of the retail environment to a plurality of machine learning classifiers, a first portion of the plurality of machine learning classifiers trained on labeled videos, to classify a sequence of images of a customer into a probability certainty of a respective activity being performed by the customer to define probability certainties of the respective activities of the customer, and a second portion of the plurality of machine learning classifiers that are not associated with a label for a particular activity and are trained using unsupervised learning on training videos of events occurring prior to loss events to identify a correlation between the training videos and the video feed;

apply the probability certainties of the respective activities of the customer and the correlation between the training videos and the video feed to a set of business rules to determine whether the respective activities of the customer identified by the probability certainties indicate suspicious behavior, wherein the instructions to apply the probability certainties to the business rules include instructions to:

determine a weight for each respective activity;

determine an activity score for each respective activity based on the probability certainty for the respective activity and the weight for each respective activity; and determine that the respective activities of the customer indicate suspicious behavior in response to a sum of each activity score for each respective activity satisfying a threshold; and provide a notification of the suspicious behavior.

18. The non-transitory computer readable medium of claim 17, wherein the second portion of the plurality of machine learning classifiers trained using unsupervised learning are trained on a set of videos of shoplifters for a time frame prior to known shoplifting events.

* * * * *